United States Patent [19]
Yi-Chen

[11] Patent Number: 5,992,869
[45] Date of Patent: Nov. 30, 1999

[54] ANTI-TANGLE MECHANISM FOR A BICYCLE

[76] Inventor: Chi Yi-Chen, No. 139-5, An Mei Rd.,Mei Shan Tsun, Hou Li Hsiang, Taichung Hsien, Taiwan

[21] Appl. No.: 09/012,594

[22] Filed: Jan. 23, 1998

Related U.S. Application Data

[63] Continuation-in-part of application No. 08/690,390, Jul. 26, 1996, abandoned.

[51] Int. Cl.$^6$ ..................................................... B62K 1/00
[52] U.S. Cl. .......................... 280/264; 280/279; 74/502.6
[58] Field of Search ................................... 280/264, 279, 280/280; 74/551.1, 551.2, 502.6

[56] References Cited

U.S. PATENT DOCUMENTS

| | | | |
|---|---|---|---|
| 4,616,523 | 10/1986 | Jones ........................................ | 280/264 |
| 4,753,448 | 6/1988 | Nagashima .............................. | 280/279 |
| 4,770,435 | 9/1988 | Cristie ...................................... | 280/279 |
| 5,605,076 | 2/1997 | Wu .......................................... | 74/551.1 |
| 5,615,585 | 4/1997 | Chi .......................................... | 280/279 |

*Primary Examiner*—Daniel G. DePumpo
*Attorney, Agent, or Firm*—Rosenberg, Klein & Lee

[57] ABSTRACT

An anti-tangle mechanism for a bicycle includes a first part disposed to an upper end of a head tube wherein the first part has an inner flange, a second part rotatably mounted to the first part and a third part mounted to the second part. The second part has a first block disposed to a periphery thereof and the third part has a second block disposed to a periphery thereof so that a first cable connected between the first block and a brake lever, and a second cable connected between the second block and a front brake device. The second part has three second holes defined therein and the third part has three inclined slots defined therein so as to have a bolt extending through each pair of the second hole and the inclined slot. A fourth part is received in the first part and has a flange extending from a top thereof so as to mount on the third part. A rear brake cable extends through the flange and the inner flange of the first part and is connected a rear brake device. When the first brake cable is pulled, the second part is rotated to lift the third part and the fourth part by the bolt moving along an inner periphery of the slot so as to pull the second cable and the rear brake cable.

4 Claims, 4 Drawing Sheets

5,992,869

ANTI-TANGLE MECHANISM FOR A BICYCLE

This application is a continuation-in-part application of U.S. patent application Ser. No. 08/690,390, now abandoned entitled as "ANTI-TANGLE MECHANISM FOR A BICYCLE" to Yi-Chen Chi, filed on Jul. 26, 1996.

BACKGROUND OF THE INVENTION

The present invention relates to an anti-tangle mechanism for a bicycle and more particularly to an anti-tangle mechanism disposed to a head tube of a bicycle so as to prevent a rear brake cable from being tangled with a steering stem received in the head tube when a handlebar is rotated.

Generally, a bicycle equipped with a front brake mechanism disposed to a front wheel of the bicycle and a rear brake mechanism disposed to a rear wheel of the bicycle. Each one of the two brake mechanisms is operated by pulling a brake lever disposed to a handlebar to pull a front/rear brake cable connected between the lever and the respective brake mechanism such that the bicycle is stopped. The front brake cable is inserted through the hollow steering stem and extends out from the front fork so as to connected the front brake mechanism and the rear brake cable extends from the lever and is arranged along the steering stem to the rear brake means. However, for some so-called "Freestyle BMX" bicycles, there is a need for anti-tangling means which will allow the handlebars to be rotated continuously without winding the back brake cable around the steering stem. There is no need for any anti-tangling means or mechanism in respect of the front brake since it is normal procedure to have the front brake cable passing through a hollow steering stem bolt and out under a front fork to the front brake mechanism.

The present invention intends to provide an anti-tangle mechanism which effectively prevents the rear brake cable from being tangled to the steering stem when the handlebar is rotated so as to mitigate and/or obviate the above-mentioned problems.

SUMMARY OF THE INVENTION

The present invention provides an anti-tangle mechanism for a bicycle, wherein the bicycle includes a head tube having an upper race disposed to an upper end thereof and a lower race disposed to a lower end thereof, a handlebar rotatably connected to the head tube and having a brake lever connected thereto, and a front brake means and a rear brake means respectively disposed to a frame thereof, the anti-tangle mechanism comprising a first part being a tubular member and having a first flange extending radially outwardly from an outer periphery thereof and an inner flange extending radially inwardly from an inner periphery thereof. The inner flange has a first hole defined therein and is securely disposed between the upper end of the head tube and the upper race.

A second part is a tubular member and receives the first part therein. The second part has a second flange extending radially outwardly from an outer periphery thereof, a first lug extending radially outwardly from a periphery of the second flange for a first block being disposed on the first lug. A first cable is connected between the brake lever and the first block. The second part has at least two second holes defined in a periphery thereof.

A third part is a tubular member and receives the second part therein. The third part has at least two slots defined in a periphery thereof and each of the slots is inclined corresponding to a longitudinal axis of the third part. Each pair of the second hole and the slot corresponding to the second hole have a bolt extending therethrough. A second lug extends radially and outwardly from a top periphery thereof and a second block is disposed to an under surface of the second lug. A second cable is connected between the rear brake means and the second block.

A fourth part is a tubular member and is received in the first part. The fourth part has a third flange extending radially and outwardly from a top periphery thereof and a third hole is defined in the third flange. A rear brake cable has one of two ends thereof fixedly engaged with the third hole and the other end thereof being connected to the rear brake means via the first hole of the first part such that when the first cable is pulled, the second part is then rotated and the third part together with the fourth part are raised by each of the bolts moving along an inner periphery of the corresponding slot so as to pull the second cable and the rear brake cable.

It is an object of the present invention to provide an anti-tangle mechanism for a bicycle, which is disposed to an upper end of a head tube of the bicycle and allows the handlebar to be rotated continuously without winding the rear brake cable around the steering stem.

It is another object of the present invention to provide an anti-tangle mechanism which is easily to be disposed on a conventional bicycle without changing too much.

It is a further object of the present invention to provide an anti-tangle mechanism which is made simply and inexpensively.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
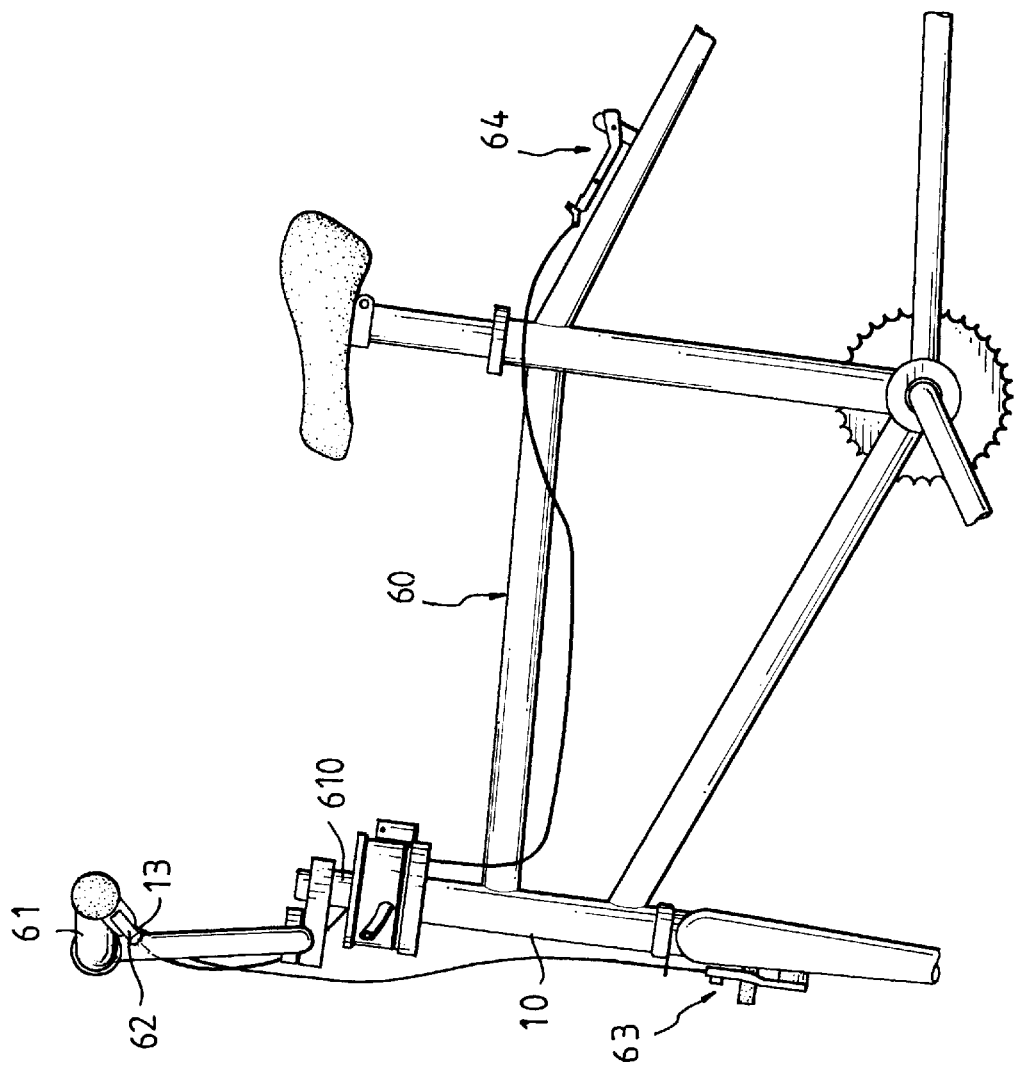
FIG. 1 is an illustrative view of a bicycle to which an anti-tangle mechanism in accordance with the present invention is disposed.
Figure 2:
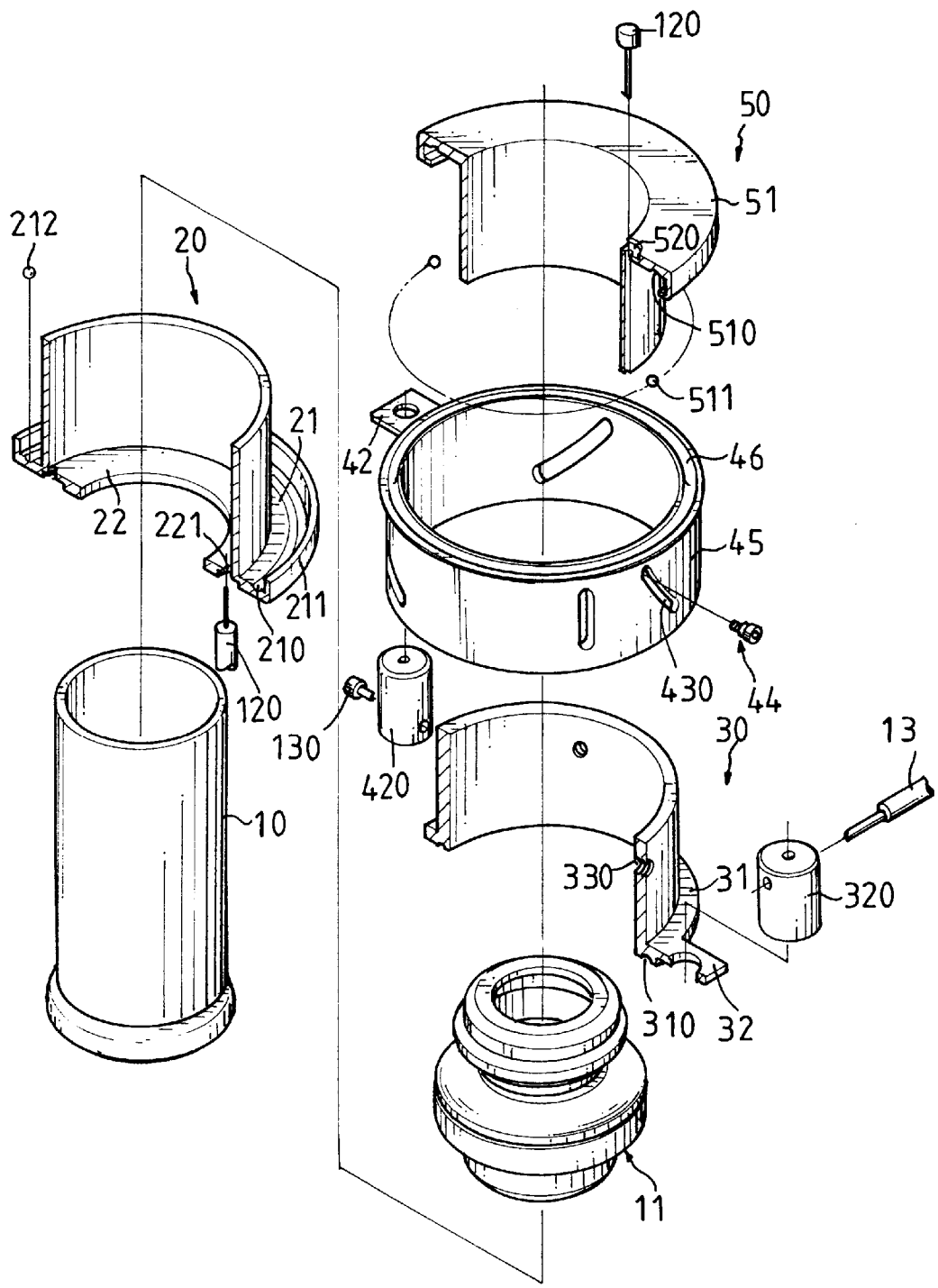
FIG. 2 is an exploded view of an anti-tangle mechanism in accordance with the present invention.
Figure 3:
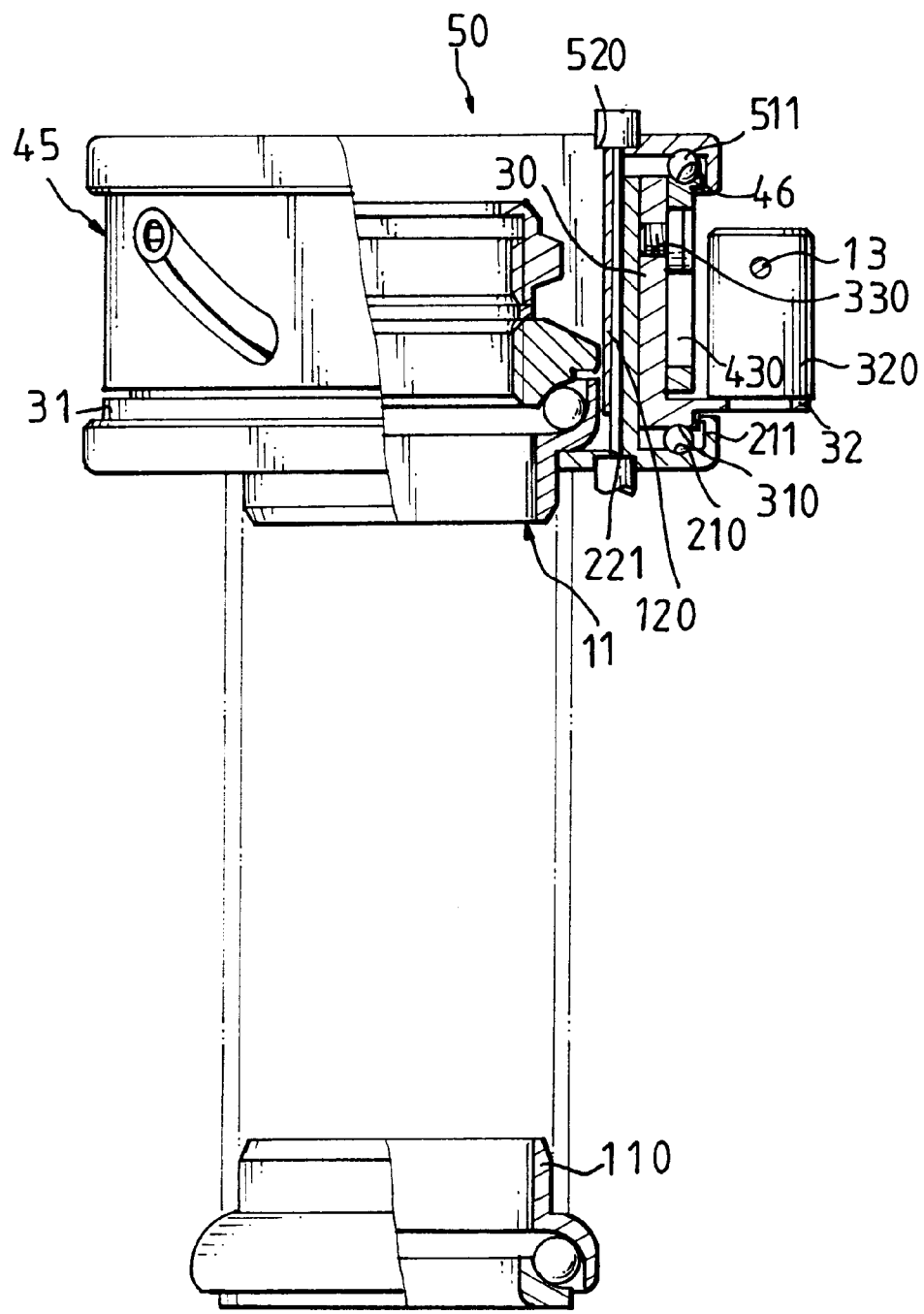
FIG. 3 is a side elevational view, partly in section, of the mechanism when the rear brake cable is not pulled.

Referring to the drawings and initially to FIGS. 1 through 3, a bicycle comprising a frame 60 having a head tube 10 through which a steering stem 610 of a handlebar 61 extends. The handlebar 61 has at least one brake lever 62 disposed thereto from which a first cable 13 extends. The frame 60 has a front brake means 63 and a rear brake means 64 respectively disposed thereto so as to brake the front wheel and the rear wheel (both not shown) respectively. The head tube 10 has an upper race 11 disposed to an upper end thereof and a lower race 110 disposed to a lower end thereof.

An anti-tangle mechanism in accordance with the present invention generally includes a first part 20 which is a tubular member and has a first flange 21 extending radially outwardly from an outer periphery thereof and an inner flange 22 extends radially inwardly from an inner periphery thereof. The first flange 21 has a first groove 210 defined in an upper surface thereof and the inner flange 22 has a first hole 221 defined therein. A skirt portion 211 extends upwardly from a periphery of the first flange 21 and the inner flange 22 is securely disposed between the upper end of the head tube 10 and the upper race 11.

A second part 30 is a tubular member and receives the first part 20 therein. The second part 30 has a second flange 31 extending radially outwardly from an outer periphery thereof and a first lug 32 extends radially outwardly from a periphery of the second flange 31. A first block 320 is fixedly disposed on the first lug 32 such that the first cable 13 is fixedly connected between the brake lever 62 and the first block 320. The second part 30 further has three second holes 330 defined in a periphery thereof and each of the second holes 330 has a threaded inner periphery defined therein. The second flange 31 has a second groove 310 defined in an under surface thereof such that balls 212 are received between the first groove 210 and the second groove 310 to facilitate a relative rotational movement between the first part 20 and the second part 30.

A third part 45 is a tubular member and receives the second part 30 therein. The third part 45 has three slots 430 defined in a periphery thereof and each of the slots 430 is inclined corresponding to a longitudinal axis of the third part 45. Each pair of the second holes 330 and the slot 430 corresponding to the second hole 330 have a bolt 44 extending therethrough wherein the bolt 44 is threadedly engaged with the threaded inner periphery of the second hole 330. A second lug 42 extends radially and outwardly from a top periphery of the third part 45 and a second block 420 is disposed to an under surface of the second lug 42. A second cable 130 is fixedly connected between the second block 420 and the front brake means 63.

A fourth part 50 is a tubular member and is received in the first part 20. The fourth part 50 has a third flange 51 extending radially and outwardly from a top periphery thereof. The third part 45 has a third groove 46 defined in an upper end thereof and the fourth part 50 has a fourth groove 510 defined in an under surface of the third flange 51 thereof such that balls 511 are received between the third groove 46 and the fourth groove 510 to facilitate a relative rotational movement between the third part 45 and the fourth part 50. A third hole 520 is defined in the third flange 51 such that a rear brake cable 120 has one of two ends thereof fixedly received in the third hole 520 and the other end thereof extending through the first hole 221 and being fixedly connected to rear brake means 64.

Figure 4:
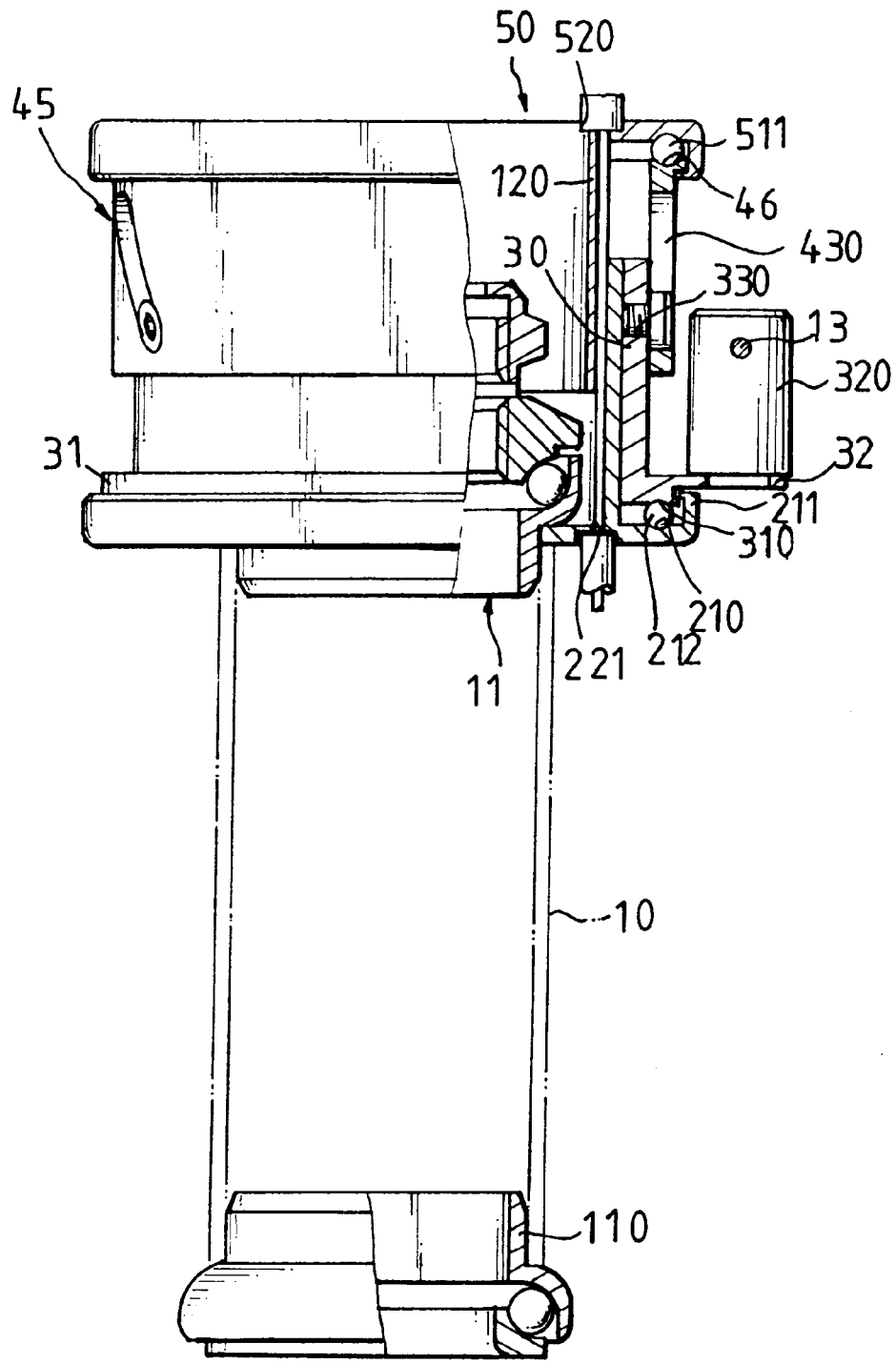
FIG. 4 is a side elevational view, partly in section, of the mechanism when the third part and the fourth part are lifted and the rear brake cable is therefore pulled.

Referring to FIG. 4, when the brake lever 62 is pulled, the first cable 13 is pulled and the second part 30 is then rotated, the third part 45 together with the fourth part 50 are raised by each of the bolts 44 moving along an inner periphery of the corresponding slot 430 so as to pull the second cable 130 and the rear brake cable 120.

Accordingly, when the handlebar 61 is rotated, the first and the second cable 13, 130 are rotated together with the second part 30 and the third part 45, the rear brake cable 120 is not tangled because the rear brake cable 120 extends through the fixed inner flange 22 and the third flange 51 such that when the handlebar 61 is rotated the rear brake cable 120 is still maintained in the first part 20.

Although the invention has been explained in relation to its preferred embodiment, it is to be understood that many other possible modifications and variations can be made without departing from the spirit and scope of the invention as hereinafter claimed.

What is claimed is:

1. An anti-tangle mechanism for a bicycle which includes a head tube having an upper race disposed to an upper end thereof and a lower race disposed to a lower end thereof, a handlebar rotatably connected to said head tube and having a brake lever connected thereto, and a front brake means and a rear brake means respectively disposed to a frame thereof, said anti-tangle mechanism comprising:

a first part being a tubular member and having a first flange extending radially outwardly from an outer periphery thereof and an inner flange extending radially inwardly from an inner periphery thereof, said inner flange having a first hole defined therein, said inner flange securely disposed between said upper end of said head tube and said upper race;

a second part being a tubular member and receiving said first part therein, said second part having a second flange extending radially outwardly from an outer periphery thereof, a first lug extending radially outwardly from a periphery of said second flange for a first block being disposed on said first lug, a first cable being adapted to be connected between said brake lever and said first block, said second part having at least two second holes defined in a periphery thereof;

a third part being a tubular member and receiving said second part therein, said third part having at least two slots defined in a periphery thereof, each of said slots being inclined corresponding to a longitudinal axis of said third part, each pair of said second hole and said slot corresponding to said second hole having a bolt extending therethrough, a second lug extending radially and outwardly from a top periphery thereof and a second block disposed to an under surface of said second lug, a second cable being adapted to be connected between said rear brake means and said second block;

a fourth part being a tubular member and being received in said first part, said fourth part having a third flange extending radially and outwardly from a top periphery thereof and a third hole defined in said third flange, a rear brake cable having one of two ends thereof fixedly engaged with said third hole and the other end thereof being adapted to be connected to said rear brake means via said first hole of said first part such that when said first cable is pulled, said second part is then rotated and said third part together with said fourth part are raised by each of said bolts moving along an inner periphery of said corresponding slot so as to pull said second cable and said rear brake cable.

2. The mechanism as claimed in claim 1 wherein said first flange has a first groove defined in an upper surface thereof and said second flange has a second groove defined in an under surface thereof such that balls are received between said first groove and said second groove to facilitate a relative rotational movement between said first part and said second part.

3. The mechanism as claimed in claim 1 wherein said third part has a third groove defined in an upper end thereof and said fourth part has a fourth groove defined in an under surface of said third flange thereof such that balls are received between said third groove and said fourth groove to facilitate a relative rotational movement between said third part and said fourth part.

4. The mechanism as claimed in claim 1 wherein each of said second holes has a threaded inner periphery defined therein.

* * * * *